Oct. 1, 1935.  J. A. BOOMAN  2,015,990

AUTOMATIC CUTTING MACHINE

Filed May 21, 1935  3 Sheets-Sheet 1

INVENTOR.
JOHN A. BOOMAN,
BY
J. Harlan
ATTORNEY.

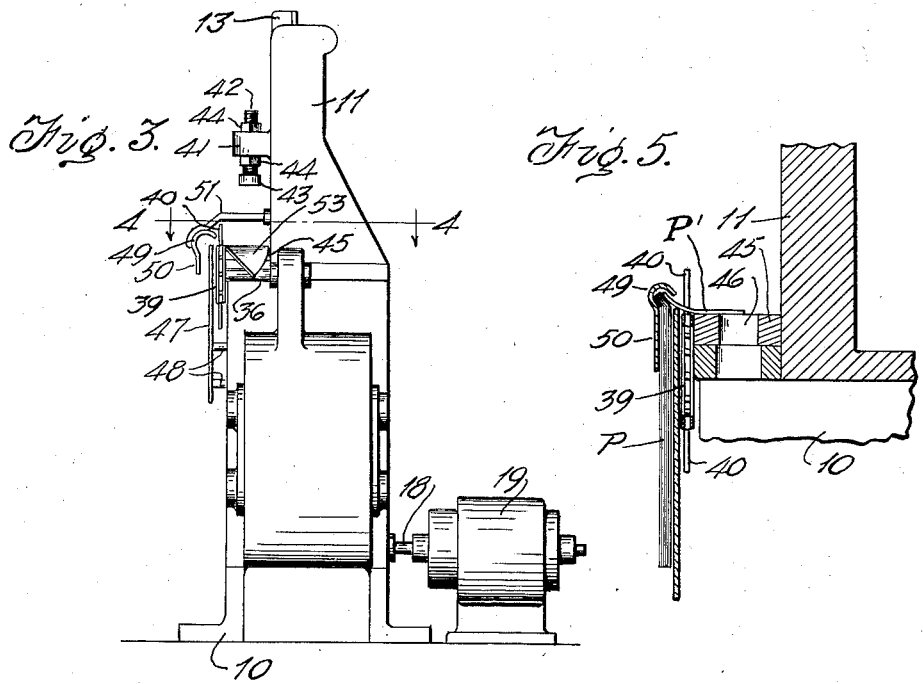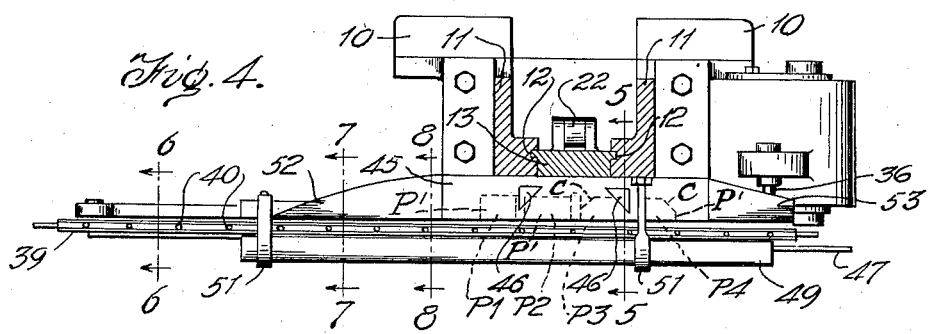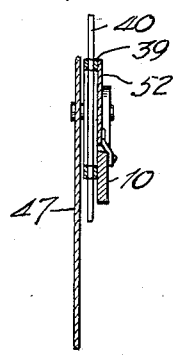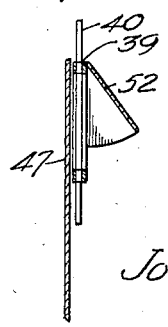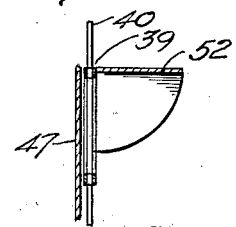

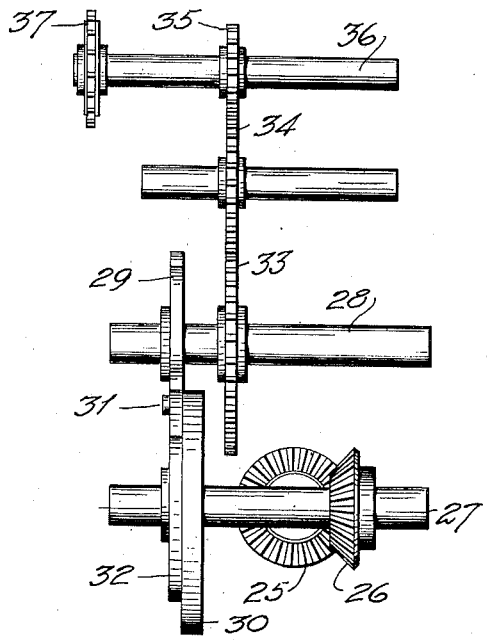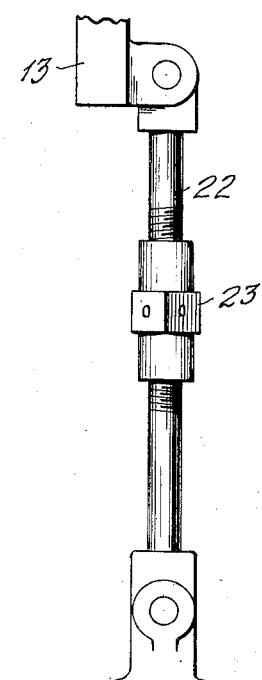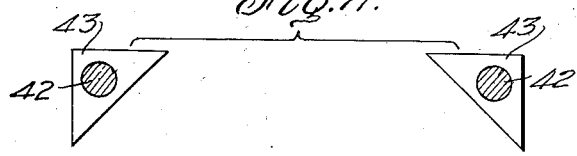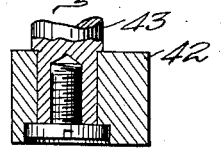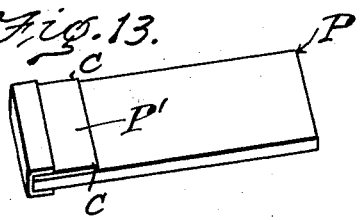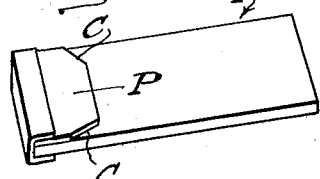

Patented Oct. 1, 1935

2,015,990

UNITED STATES PATENT OFFICE 2,015,990

AUTOMATIC CUTTING MACHINE

John Alan Booman, Queens Village, N. Y.

Application May 21, 1935, Serial No. 22,627

12 Claims. (Cl. 164—48)

This invention relates to the preparation of pads of paper such as the pads of bank checks which are used in connection with a pocket provided cover wherein the backing board of the pad is received.

More particularly the invention relates to a corner cutter for pad backings.

The backings for pads of this class are usually quite short and, in order to facilitate the assembling of such backings with the paper strips forming the pad, they are cut to rectangular form thus having right angled corners at their free edges. Such sharp corners are difficult to insert in the small pocket provided for the purpose in the carrying cases or covers used with such pads. Because of this it is customary to cut the corners of these so as to provide small free ends readily insertable in the pockets. This cutting operation usually requires individual handling of each pad by an operator.

One important object of the present invention is to provide a novel machine adapted to cut off the free square corners of such pads.

A second important object of the invention is to provide such novel machine with means for successively feeding pads past a reciprocating corner cutter.

A third important object of the invention is to so arrange the feeding mechanism in a novel manner so that the feeding movement is stopped during the cutting movement of the cutter and the pad held against movement out of such cutting position until the cutting has been effected.

A fourth important object of the invention is to provide novel means in such a machine for supporting the pads as they move through the machine.

A fifth important object of the invention is to provide novel arrangement in such a machine for swinging the free edge portion of the backing away from the body of the pad to bring such backing into the proper plane to be cut by the machine.

With the above and other objects in view, as will be presently apparent, the invention consists in general of certain novel details of construction and combinations of parts hereinafter fully described, illustrated in the accompanying drawings and specifically claimed.

In the accompanying drawings like characters of reference indicate like parts in the several views, and:—

Figure 3 is an end elevation of the machine, the view being taken from the delivery end of the machine.

Figure 4 is a section on the line 4—4 of Figure 3, the motor and its drive being omitted.

Figure 5 is an enlarged detail section on the line 5—5 of Figure 4, certain parts behind the section plane being omitted.

Figure 6 is a similar section on the line 6—6 of Figure 4.

Figure 7 is a similar section on the line 7—7 of Figure 4.

Figure 8 is a similar section on the line 8—8 of Figure 4.

Figure 9 is an end elevation to an enlarged scale of the gearing arrangement.

Figure 10 is an enlarged section showing the eccentric drive for the ram.

Figure 11 is an enlarged detail plan view of the pair of punches used herewith.

Figure 12 is an enlarged section showing the manner in which these punches are attached to their stems.

Figure 13 is a perspective view of the pad showing the pad backing uncut.

Figure 14 is a similar view as Figure 13 but showing the corners of the pad backing cut, for which operation this machine is designed for.

Figure 1:
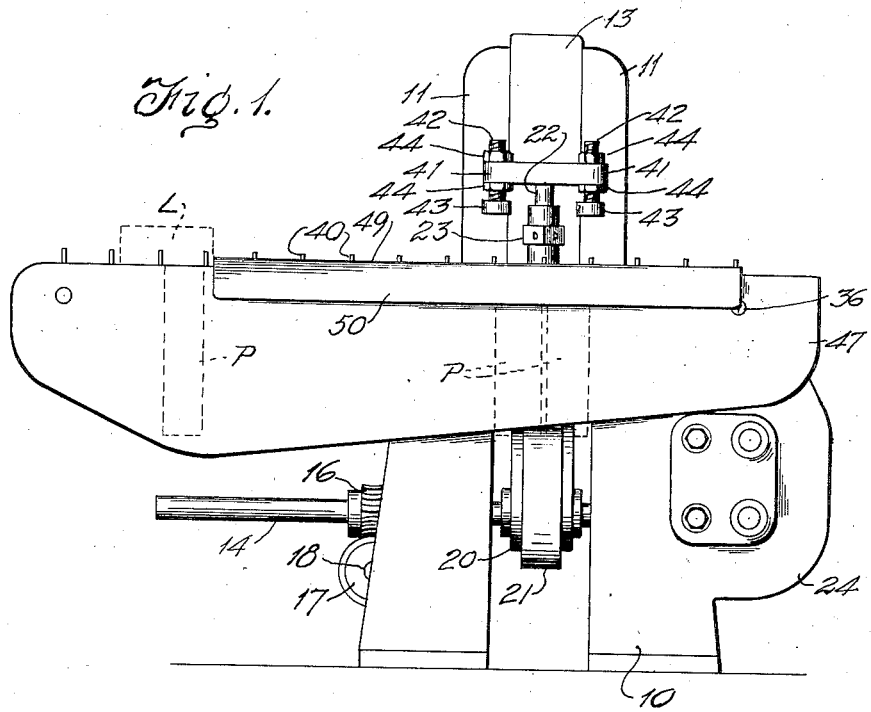
Figure 1 is a front elevation of a machine constructed in accordance with this invention.

In the embodiment of the invention as here shown there is provided a base 10 on top of which is mounted a guide frame including a pair of vertical legs 11 having guide grooves 12 to guide a head or ram 13. Extending from side to side of the base is a shaft 14 which is journalled in suitable bearings 15 suitably supported in the base by means not deemed necessary to here show. On this shaft is fixed a worm wheel 16 wherewith meshes a worm 17. The worm 17 is fixed on the shaft 18 of a suitable motor 19 which forms the motive means for all the mechanism. Between the legs of the base 10 there is fixed on the shaft 14 an eccentric 20 whereon is mounted an eccentric strap 21 to which is pivoted the lower end of a connecting rod or pitman 22. This pitman has its upper end pivoted to the ram 13 and is adjustable for length, being made in two sections connected by a turnbuckle 23.

At one side of the base there is provided a gear housing 24 into which one end of the shaft 14 extends. Fixed on the shaft 14 within the housing 24 is a miter gear 25 which meshes with a similar gear 26 fixed on a shaft 27 journalled in the walls of the housing 24. Above and parallel to the shaft 27 there is provided a shaft 28 on which is fixed a Geneva wheel 29. On the shaft 27 is fixed a disc 30 provided with a pin 31 engaging the slots of the Geneva wheel in succession. On the shaft 27 is also fixed a disc 32 engaging the concave segments of the Geneva wheel in the intervals between the engagement of the pin 31 in the slots. The disc 32 is provided with the usual segmental notch to permit the wheel 29 to rotate during its engagement by the pin 31. On the shaft 28 is also fixed a gear 33 which meshes with an idler gear 34. The gear 34 also meshes with a gear 35 fixed on a shaft 36 which carries a sprocket wheel 37. At the opposite side of the machine is a second sprocket wheel 38 and over the wheels 37 and 38 is trained a sprocket chain 39 carrying evenly spaced fingers 40, the spaces between the fingers being of proper width to accommodate the pad to be cut.

Extending forwardly from the lower front part of the ram 13 is a flange 41 wherethrough passes a pair of spaced screws 42 carrying cutting punches 43 on their lower ends. Nuts 44 on these screws serve to hold the punches in adjusted positions. These punches have diagonal cutting edges and cooperate with a corresponding die 45 supported on top of the front part of the base 10 and having openings 46 provided with diagonal cutting edges.

Extending along the sprocket chain and close to the front edge thereof is a vertical plate or apron 47 supported from the base 10 as at 48. The upper edge of this apron is about even with the top face of the die 45. Over this upper edge extends a channel 49 which opens diagonally downward toward said die 45. This channel has its front leg 50 extending downward of the apron 47 and lies in spaced relation thereto, being supported from the frame and base by brackets 51.

Along the inner or rear side of the sprocket chain extends a guide plate 52 which, at the end remote from the die is vertical and which is twisted or warped so that its other end abuts the die 45 level with its upper surface. The warping of this plate can be clearly seen by reference to Figures 5 to 7. A similar but shorter and less twisted or warped plate 53 extends from the opposite side of the die 45.

Figure 2:
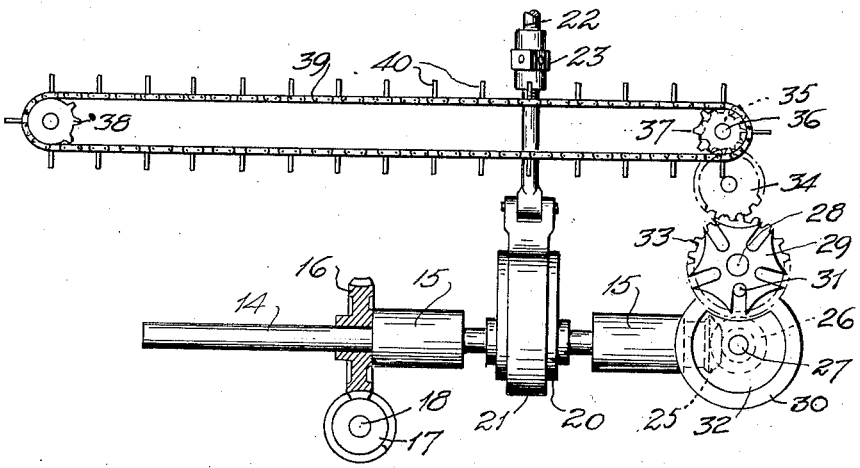
Figure 2 is a front elevation of the gearing arrangement used in this machine, the gearing being shown apart from the remainder of the machine.

In using the machine the pads P move from the left to the right of Figures 1 and 4. These pads may be fed to the machine at the loading station indicated by dotted lines at L in Figure 1. This feeding may be manual but is preferably performed by an automatic feeder (not shown) which may be driven from the shaft 14, the latter being extended to the left for this purpose as shown in Figures 1 and 2. Whether the feeding is performed mechanically or manually the pads P (shown in dotted lines) are positioned with the body of each in front of the apron and its backing behind the vertical portion of the warped guide 52 and between adjacent fingers 40. The operation of the motor effects constant reciprocation of the ram 13 and the punches carried thereby. At the same time the upper run of the sprocket chain 39 is moved step-by-step to the right. This causes the pads P to move step-by-step to the right and as each pad thus moves its backing P' is guided by the warped plate 52 in such manner that the free edge portion of the pad backing P' will move onto the upper face of the die block 45 in a substantially horizontal position. As each pad slides along the apron its upper end passes into the channel 49 so that it is held from rising under the influence of the warping of its backing. Referring now to Figure 4 it will be seen that four positions are indicated for a pad passing through the machine. It is to be noted that the Geneva movement is so proportioned that the sprocket chain advances a distance equal to the distance between centers of adjacent fingers 40 for each reciprocation of the ram 13 and that this advancing movement takes place during the time the ram is raised and the punches free from the backings. As will be seen the backing P' at P1 has not yet been cut. At the next advance of the chain the pad passes to the position P2 with the left corner C of the backing P' overhanging the left die opening 46 so that, as the ram descends, this left corner C is cut off. Similarly, the right corner C is cut off at P3 and the pad delivered at P4 with both corners C of the backing P' cut on the next two movements of the chain. From there the pad is moved along the pass off the apron, the warped guide 53 allowing the backing P' to close slowly towards the body of the pad.

Obviously, the dies and the fingers 40 may be so spaced that both corners may be simultaneously cut from the backing and it will be also obvious that the spacing of the dies and fingers will be such, whether cutting the corners simultaneously or singly, as to suit the particular width of backing being handled.

There has been provided a simple and efficient device of the kind described and for the purpose specified.

It is obvious that changes may be made in the form and construction of the invention without departing from the material principles involved. It is not, therefore, desired to confine the invention to the exact form herein shown and described but it is desired to include all forms which come within the scope of the appended claims.

What is claimed is:—

1. The combination with a cutting mechanism including a reciprocating punch and a die with which the punch cooperates; of feeding means to move a pad of leaves of paper secured together at one edge across said cutting mechanism, operating means to reciprocate the punch and to operate the feeding means in a step-by-step movement past the die in synchronism with the operation of said punch, and guide means arranged to swing the free end of one leaf of the pad away from the remainder of the pad and to guide said free end between the punch and die.

2. The combination with a cutting mechanism including a reciprocating punch and a die with which the punch cooperates; of feeding means to move a pad of leaves of paper secured together at one edge across said cutting mechanism, operating means to reciprocate the punch and to operate the feeding means in a step-by-step movement past the die in synchronism with the operation of said punch, guide means arranged to swing the free end of one leaf of the pad away from the remainder of the pad and to guide said free end between the punch and die, and supporting means extending across the cutting mechanism in front thereof to support the pad during its movement across said cutting mechanism.

3. The combination with a cutting mechanism including a reciprocating punch and a die with which the punch cooperates; of feeding means to move a pad of leaves of paper secured together at one edge across said cutting mechanism, operating means to reciprocate the punch and to operate the feeding means in a step-by-step movement past the die in synchronism with the operation of said punch, guide means arranged to swing the free end of one leaf of the pad away from the remainder of the pad and to guide said free end between the punch and die, supporting means extending across the cutting mechanism in front thereof to support the pad during its movement across said cutting mechanism, and pad retaining means extending over the middle part of the supporting means to hold the pad against displacement during the cutting operation.

4. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, and guide means arranged to swing the free end of one leaf of the pad away from the remainder of the pad and to guide said free end between the punch and die.

5. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, guide means arranged to swing the free end of one leaf of the pad away from the remainder of the pad and to guide said free end between the punch and die, and supporting means extending across the cutting mechanism in front thereof to support the pad during its movement across said cutting mechanism.

6. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, guide means arranged to swing the free end of one leaf of the pad away from the remainder of the pad and to guide said free end between the punch and die, supporting means extending across the cutting mechanism in front thereof to support the pad during its movement across said cutting mechanism, and pad retaining means extending over the middle part of the supporting means to hold the pad against displacement during the cutting operation.

7. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, and a vertical apron extending along said chain and on which a pad may be hung with one leaf between adjacent fingers of the chain with the remainder of the pad depending from the upper edge of the apron.

8. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, a vertical apron extending along said chain and on which a pad may be hung with one leaf between adjacent fingers of the chain with the remainder of the pad depending from the upper edge of the apron, and a guide plate for the finger engaged leaf of the pad, said guide plate being warped to provide a vertical end remote from the die and a horizontal end flush with the upper face of the die and abutting said die.

9. The combination with a cutting mechanism, including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, a vertical apron extending along said chain and on which a pad may be hung with one leaf between adjacent fingers of the chain with the remainder of the pad depending from the upper edge of the apron, and pad retaining means extending over the middle part of the supporting means to hold the pad against displacement during the cutting operation.

10. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, a vertical apron extending along said chain and on which a pad may be hung with one leaf between adjacent fingers of the chain with the remainder of the pad depending from the upper edge of the apron, a guide plate for the finger engaged leaf of the pad, said guide plate being warped to provide a vertical end remote from the die and a horizontal end flush with the upper face of the die and abutting said die, and pad retaining means extending over the middle part of the supporting means to hold the pad against displacement during the cutting operation.

11. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, a vertical apron extending along said chain and on which a pad may be hung with one leaf between adjacent fingers of the chain with the remainder of the pad depending from the upper edge of the aprong, and an inverted channel arranged above the middle part of the apron and spaced from its upper edge, one flange of said channel extending downwardly in spaced relation to the front of the apron.

12. The combination with a cutting mechanism including a reciprocating punch and a die with which the punch cooperates; of a sprocket chain supported to move past the die in front thereof and having spaced fingers between which may be held a portion of a pad of leaves of paper secured together at one edge, operating means for said punch, gearing driven by said operating means and driving said chain with a step-by-step movement past the die, a vertical apron extending along said chain and on which a pad may be hung with one leaf between adjacent fingers of the chain with the remainder of the pad depending from the upper edge of the apron, a guide plate for the finger engaged leaf of the pad, said guide plate being warped to provide a vertical end remote from the die and a horizontal end flush with the upper face of the die and abutting said die, and an inverted channel arranged above the middle part of the apron and spaced from its upper edge, one flange of said channel extending downwardly in spaced relation to the front of the apron.

JOHN ALAN BOOMAN.